United States Patent
Lewis

(10) Patent No.: US 6,292,382 B1
(45) Date of Patent: Sep. 18, 2001

(54) NANOMETRIC WRITING AND ERASURE COMBINED WITH SUPERSENSITIVE READING WITHOUT ERASURE

(75) Inventor: Aaron Lewis, Jerusalem (IL)

(73) Assignee: Nanoptics, Inc., Jerusalem (IL)

( * ) Notice: Subject to any disclaimer, the term of this patent is extended or adjusted under 35 U.S.C. 154(b) by 0 days.

(21) Appl. No.: 09/423,357

(22) PCT Filed: Jun. 1, 1998

(86) PCT No.: PCT/US98/10697

§ 371 Date: Nov. 23, 1999

§ 102(e) Date: Nov. 23, 1999

(87) PCT Pub. No.: WO98/54726

PCT Pub. Date: Dec. 3, 1998

(30) Foreign Application Priority Data

Jun. 1, 1997 (IL) ........................................................ 120961

(51) Int. Cl.[7] ....................................................... G11C 5/02
(52) U.S. Cl. ................................................. 365/51; 73/105
(58) Field of Search .................................. 365/51; 73/105

(56) References Cited

U.S. PATENT DOCUMENTS

| 4,773,060 | 9/1988 | Shimada et al. ...................... 369/100 |
| 4,956,817 | 9/1990 | West et al. ....................... 365/189.01 |
| 5,038,322 | 8/1991 | Van Loenen .......................... 365/114 |
| 5,144,581 | 9/1992 | Toda et al. ........................... 365/151 |
| 5,237,529 | 8/1993 | Spitzer ................................. 365/158 |
| 5,547,774 | 8/1996 | Gimzewski et al. ................. 428/694 |
| 6,079,255 | * 6/2000 | Binnig et al. ........................... 73/105 |

* cited by examiner

*Primary Examiner*—David Nelms
*Assistant Examiner*—M. Tran
(74) *Attorney, Agent, or Firm*—Jones, Tullar & Cooper PC

(57) ABSTRACT

A hollow, scanned probe tip is used to write and erase information in a material in manometric dimensionalities, as well as to provide ultrasensitive sensing of the stored information. The material is excited to alter it for writing and erasing, while sensing, or reading, of the stored information is accomplished by highly sensitive force sensing.

34 Claims, 1 Drawing Sheet

NANOMETRIC WRITING AND ERASURE COMBINED WITH SUPERSENSITIVE READING WITHOUT ERASURE

1. FIELD OF THE INVENTION

This invention deals with the area of high density optical memories which can be extended to nanoswitches and nanoswitch arrays. The essence of the invention is electrical, chemical, thermal, magnetic and/or optical excitation of a material by a scanned probe microscope tip. The material changes one of its characteristics as a result of the excitation in a way that can be sensed by the supersensitive force sensing capabilities of the scanned probe microscope tip and can be reversed at will with the same nanometric tip. The invention also can be readily extended to the formation of nanoswitches and nanoswitch arrays.

2. BACKGROUND OF THE INVENTION

Scanned probe microscopes can potentially write and read information with nonometric precision and high density. A recent study has shown [S. Hoen, H. J. Mamin and D. Rugar, Appl. Phys. Lett. 64,267 (1994)] that one of most sensitive ways to read information is by measuring an alteration using the force sensing capabilities of the scanned probe tip that imposed the change. However, this study also highlights the fact that using the approach of this study, which involved simply heating the surface and imposing a local structural change, it is not possible to reverse the process and make a write, read and erase cycle. The present invention focuses on an approach that indicates how such a write, read and erase cycle could be completed. This also leads to nanoswitches and nanoswitch arrays.

3. STATE OF PRIOR ART

There is no invention in the prior art that describes a process for write, read and erase high density memories or ultrasensitive switches that were able to use the supersensitive capabilities of force sensing of the imposed change using scanned probe techniques.

4. SUMMARY OF THE INVENTION

A method and a device that permits the erasable recording of information in nanometric dimensionalities using a scanned probe tip. The changes are then sensed by the supersensitive capabilities of the force sensing attributes of the tip. Subsequently the written information can be erased with one of the attribute of the same probe. The invention allows the separation of the writing and the erasing operation from the supersensitive reading operation. The invention can also form supersensitive nanoswitches and nanoswitch arrays.

5. DESCRIPTION OF THE INVENTION

Figure 1:
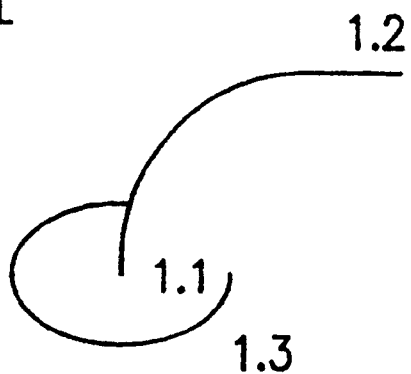
Figure 2:
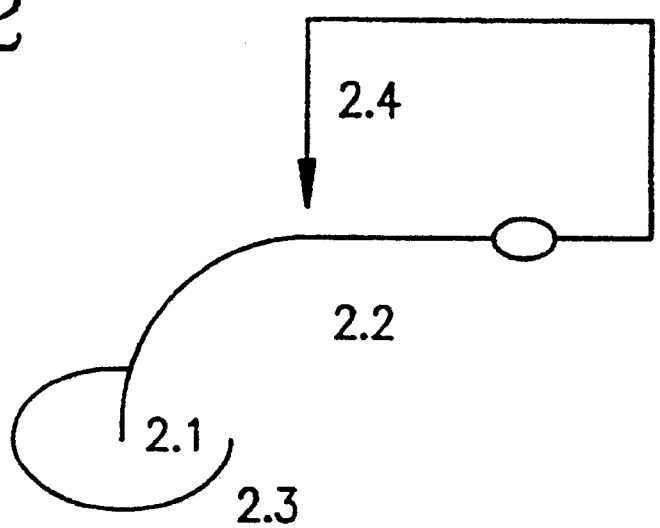

The invention is illustrated in the accompanying drawings, in which:

FIG. 1 illustrates a cantilevered tip in contact or near-contact with a material; and FIG. 2 illustrates a nanoswitch utilizing the features of the invention.

The invention consists of a method and a device that permits nanometric recording, reading and erasing of changes in a material using the multifunctional capabilities of a tip of a scanned probe microscope. The same principles could also be used to produce supersensitive nanoswitches and nanoswitch arrays.

5.1 Write, Erase and Supersensitive Reading in Ultrahigh Density Optical Memories The method and the device consists of a tip 1.1 connected to a cantilever 1.2 which is in nearcontact or contact with a material 1.3. A tip is chosen having the capability of emitting a spot of light, of acting as one electrode to impose an electrical field on the material, of delivering material through a hollow orifice force sensing element, of imposing heat on the sample while simultaneously imposing a magnetic field, or of imposing or a force on the material. The tip also has the ability to monitor the change that it has imposed using its supersensitive force sensing capabilities. As a result of one or more of these excitation methods the material alters its charge characteristics, its volume, its light emission characteristics, etc., and then this change is detected with supersensitive force sensing attribute of the tip. The object is to bypass problems of erasure of the written material and to use the most sensitive aspect of the tip for detection of the written material. The material also would have the capability of having its alteration erased by one or more of the attributes of the tip unrelated to the reading attribute of monitoring the change imposed by the excitation using the supersensitive force sensing.

In one example the tip could deliver light in a very local region using near-field optical microscopy and this would change the volume or the charge properties of the material that would be detected by the force sensing capabilities of the same tip. The volume or charge change would be stable until a second pulse of light would be imposed on the same pixel to erase the volume change that was generated in the material by the first pulse of light. In another example the tip could produce an electrical pulse that would then cause a volume change or an electrical change, such as a volume change or a change in surface charge, in the material which would be sensed by the supersensitive force sensing capabilities of the same tip.

This approach separates the excitation from a supersensitive detection event and permits detection of the change without erasure. It also permits a reversal of the volume change with the reverse of the excitation process and therefore permits erasure of the alteration. Such a device reaches an ideal of super-resolution read, write and erase memory.

An example of a material that could be used in this scheme would be a film of a protein that could change its volume with one or another of the excitation mechanisms. A specific example of such a protein is bacteriorhodopsin which can change its volume with light. Such a system also has the potential of changing its charge characteristics with excitation that may also include electrical excitation.

Another example would be a tip that was capable of heating and imposing a magnetic field on a magnetic material that would then change the force that it would impose on the tip. An example of how to generate such a tip is based on a recent study [G. Fish, O. Bouevitch, S. Kokotov, K. Lieberman, D. Palanker, I. Tutovets and A. Lewis, Rev. Sci. Instr. 66, 3942–3948 (1995)]. Although this study did not envision this invention, the techniques in this paper could be used to generate a tip with a magnetic material within the hollow tube of a tapered, cantilevered capillary that could be used to either impose heat and a magnetic field on a magnetic surface in order to write or erase and could monitor with the tip the change in the magnetic surface.

The above are simply some examples of a variety of combinations of excitation, the reversal of excitation and super-sensitive reading using force sensing.

5.2 Nanoswitches

The method and the device consists of a tip 2.1 connected to a cantilever 2.2 which is in near-contact or contact with a material 2.3. A tip is chosen having the capability of emitting a spot of light, of acting as one electrode to impose an electrical field on the material, of delivering material through a hollow orifice sensing element, of imposing heat on the sample while simultaneously imposing a magnetic field, or of imposing a force on the material. As a result of one of these multifunctional attributes of the tip, the material alters its charge characteristics, its volume, etc. and then this change is detected with the supersensitive force sensing attribute of the tip. The change in the position of the cantilever with the material alteration results in the cantilever making contact with another point 2.4. The material also would have the capability of having its alteration erased by one or more of the attributes of the tip related or unrelated to the excitation attribute. The microfabrication of arrays of such nanoswitches can be envisioned.

6. ADVANTAGES OVER PRIOR ART

No combination that would allow for writing, supersensitive reading and material erasure has been found as of yet and no nanoswitches of the type we envision in this invention have been devised.

7. APPLICATIONS

One principal application is of course very high density optical memories. However, in addition to this, nanoswitches could be constructed in this way in which the tip excites a structural change in a material and this structural change alters the position of the cantilever that allows it to either be in electrical contact with a point or to be out of contact with this point. in addition, arrays of nanoswitches of the type described in this invention could also be microfabricated and these arrays could be used in a variety of applications including neural network implementations.

What is claimed is:

1. A device for recording, detecting and erasing information in nanometric dimensionalities, comprising:
   a material capable of alteration in nanometric dimensionalities;
   a scanned probe microscope having a cantilevered tip element with multifunctional capabilities providing excitation of said material for altering the material, said element having supersensitive force sensing capabilities for also sensing such alteration of said material, wherein alterations of said material are erasable by said tip element using a variant of the excitation causing said alteration.

2. The device of claim 1, wherein said variant of the excitation for erasing said alterations is distinct from the force sensing capabilities of said tip element.

3. The device of claim 2, wherein the excitation of said material and the variant of the excitation are each selected from the group consisting of optical, electrical, chemical, thermal, magnetic, and pressure excitation.

4. The device of claim 1, further including a second cantilevered element, and wherein said variant of the excitation is provided by said second cantilevered element for erasing said alterations.

5. The device of claim 4, wherein the excitation of said material and the variant of the excitation are each selected from the group consisting of optical, electrical, chemical, thermal, magnetic and pressure excitation.

6. A device for recording, detecting and erasing information in nanometric dimensionalities, comprising:
   a material capable of alteration in nanometric dimensionalities;
   a scanned probe microscope having a cantilevered element with multifunctional capabilities providing chemical excitation of said material for altering the material, said element having supersensitive force sensing capabilities for also sensing such alteration of said material, wherein alterations of said material are erasable by a variant of the excitation causing said alteration.

7. A device for recording, detecting and erasing information in nanometric dimensionalities, comprising:
   a material capable of alteration in nanometric dimensionalities;
   a scanned probe microscope having a cantilevered element with multifunctional capabilities providing excitation of said material by pressure for altering the material, said element having supersensitive force sensing capabilities for also sensing such alteration of said material, wherein alterations of said material are erasable by a variant of the excitation causing said alteration.

8. A device for recording, detecting and erasing information in nanometric dimensionalities, comprising:
   a material capable of alteration in nanometric dimensionalities;
   a scanned probe microscope having a cantilevered element with multifunctional capabilities providing excitation of said material for altering the material;
   a nanoswitch having a first contact on said cantilever and a second contact adjacent to said cantilever;
   said cantilever element having a force sensing tip responsive to alteration of said material to cause said cantilever to cause said first and second nanoswitch contacts to open or close.

9. A device as in claim 8 in which the excitation of the nanoswitch is optical.

10. A device as in claim 8 in which the excitation of the nanoswitch is electrical.

11. A device as in claim 8 in which the excitation of the nanoswitch is chemical.

12. A device as in claim 8 in which the excitation of the nanoswitch is thermal.

13. A device as in claim 8 in which the excitation of the nanoswitch is thermal and/or magnetic.

14. A device as in claim 8 in which the excitation of the nanoswitch is pressure.

15. A device as in claim 8 which is part of an array of nanoswitches.

16. A device as in claim 9 which is part of an array of nanoswitches.

17. A device as in claim 10 which is part of an array of nanoswitches.

18. A device as in claim 11 which is part of an array of nanoswitches.

19. A device as in claim 12 which is part of an array of nanoswitches.

20. A device as in claim 13 which is part of an array of nanoswitches.

21. A device as in claim 14 which is part of an array of nanoswitches.

22. A method for producing, detecting and selectively erasing information in nanometric dimensionalities, comprising:
   providing a material capable of alteration in nanometric dimensionalities;
   exciting and thereby altering said material by a cantilevered element with multifunctional capabilities in a scanned probe microscope, said cantilevered element including a supersensitive force sensing tip;

sensing the alteration of said material with said tip; and selectively erasing said alteration of said material by supplying with said tip a variant of the excitation which caused the alteration of the material.

23. The method of claim 22, wherein the steps of exciting and thereby altering said material and of selectively erasing said alteration are each selected from the group consisting of optical, electrical, chemical, thermal, magnetic, and pressure excitation.

24. The method of claim 22, wherein selectively erasing said alteration of said material includes using a variant of the excitation by said cantilevered element which is distinct from the sensing of the alteration.

25. A method for producing, detecting and selectively erasing information in nanometric dimensionalities, comprising:

providing a material capable of alteration in nanometric dimensionalities;

chemically exciting and thereby altering said material by a cantilevered element with multifunctional capabilities in a scanned probe microscope, said cantilevered element including a supersensitive force sensing tip;

sensing the alteration of said material with said tip; and selectively erasing said alteration of said material using a variant of the chemical excitation which caused the alteration of the material.

26. A method for producing, detecting and selectively erasing information in nanometric dimensionalities, comprising:

providing a material capable of alteration in nanometric dimensionalities;

exciting by applying pressure and thereby altering said material by a cantilevered element with multifunctional capabilities in a scanned probe microscope, said cantilevered element including a supersensitive force sensing tip;

sensing the alteration of said material with said tip; and selectively erasing said alteration of said material using a variant of the pressure excitation which caused the alteration of the material.

27. A method for producing, detecting and selectively erasing information in nanometric dimensionalities, comprising:

providing a material capable of alteration in nanometric dimensionalities;

exciting and thereby altering said material by a cantilevered element with multifunctional capabilities in a scanned probe microscope, said cantilevered element including a supersensitive force sensing tip;

sensing the alteration of said material with said tip to produce corresponding motion in said cantilevered element;

activating a nanoswitch in response to said motion of said cantilevered element; and selectively erasing said alteration of said material using a variant of the excitation which caused the alteration of the material.

28. A method as in claim 27, wherein excitation of said material and corresponding activation of said nanoswitch is optical.

29. A method as in claim 27, wherein excitation of said material and corresponding activation of said nanoswitch is electrical.

30. A method as in claim 27, wherein excitation of said material and corresponding activation of said nanoswitch is chemical.

31. A method as in claim 27, wherein excitation of said material and corresponding activation of said nanoswitch is thermal.

32. A method as in claim 27, wherein excitation of said material and corresponding activation of said nanoswitch is thermal and/or magnetic.

33. A method as in claim 27, wherein excitation of said material and corresponding activation of said nanoswitch is pressure.

34. A method as in claim 27, further including activating an array of nanoswitches in response to alteration of said material.

* * * * *